Aug. 14, 1945.   J. H. YATES ET AL   2,382,689
CHOPPER OR BLOCKER APPARATUS
Filed April 29, 1943   3 Sheets-Sheet 3

Inventors
James H. Yates
Mildred Thomas
By Wilfred E. Lawson
Attorney

Patented Aug. 14, 1945

2,382,689

UNITED STATES PATENT OFFICE 2,382,689

CHOPPER OR BLOCKER APPARATUS

James H. Yates and Mildred Thomas, Danville, R. I.

Application April 29, 1943, Serial No. 485,088

3 Claims. (Cl. 97—20)

This invention relates to a plant blocker or chopper for use in blocking out sugar beets, cotton, and other vegetation and has relation more particularly to an apparatus of this character of an endless chain type.

It is an object of the invention to provide an apparatus or implement of this kind embodying a portable body provided with a driving element together with blocking or chopping elements traveling in an endless path and in driven connection with the driving element.

It is also an object of the invention to provide an apparatus or implement of this kind including a portable body having one or more frames carried thereby and extending laterally thereof, together with chopping or blocking members carried by each of said frames and traveling in a continuous and substantially vertically disposed path.

An additional object of the invention is to provide a blocking or chopping apparatus or implement including a portable body having operatively mounted thereon chopping or blocking members traveling in substantially a vertical path and wherein said members are so mounted as to be raised or elevated into an ineffective position when the apparatus or implement is not in use.

A still further object of the invention is to provide an apparatus or implement embodying a portable body together with a laterally disposed frame having one end portion operatively supported by a propeller shaft on the portable body in a manner to allow said frame to have up and down movement and wherein said frame is provided with a ground engaging supporting member and also movable chopping or blocking elements in driven connection with the propeller shaft carried by the portable body.

The invention consists in the details of construction and in the combination and arrangement of the several parts of our improved plant blocker or chopper whereby certain important advantages are attained, as will be hereinafter more fully set forth.

In order that our invention may be better understood, we will now proceed to describe the same with reference to the accompanying drawings, wherein:

Figure 5 is an enlarged fragmentary sectional view taken substantially on the line 5—5 of Figure 1, and Figure 6 is a fragmentary sectional view taken substantially on the line 6—6 of Figure 1.

Figure 1:
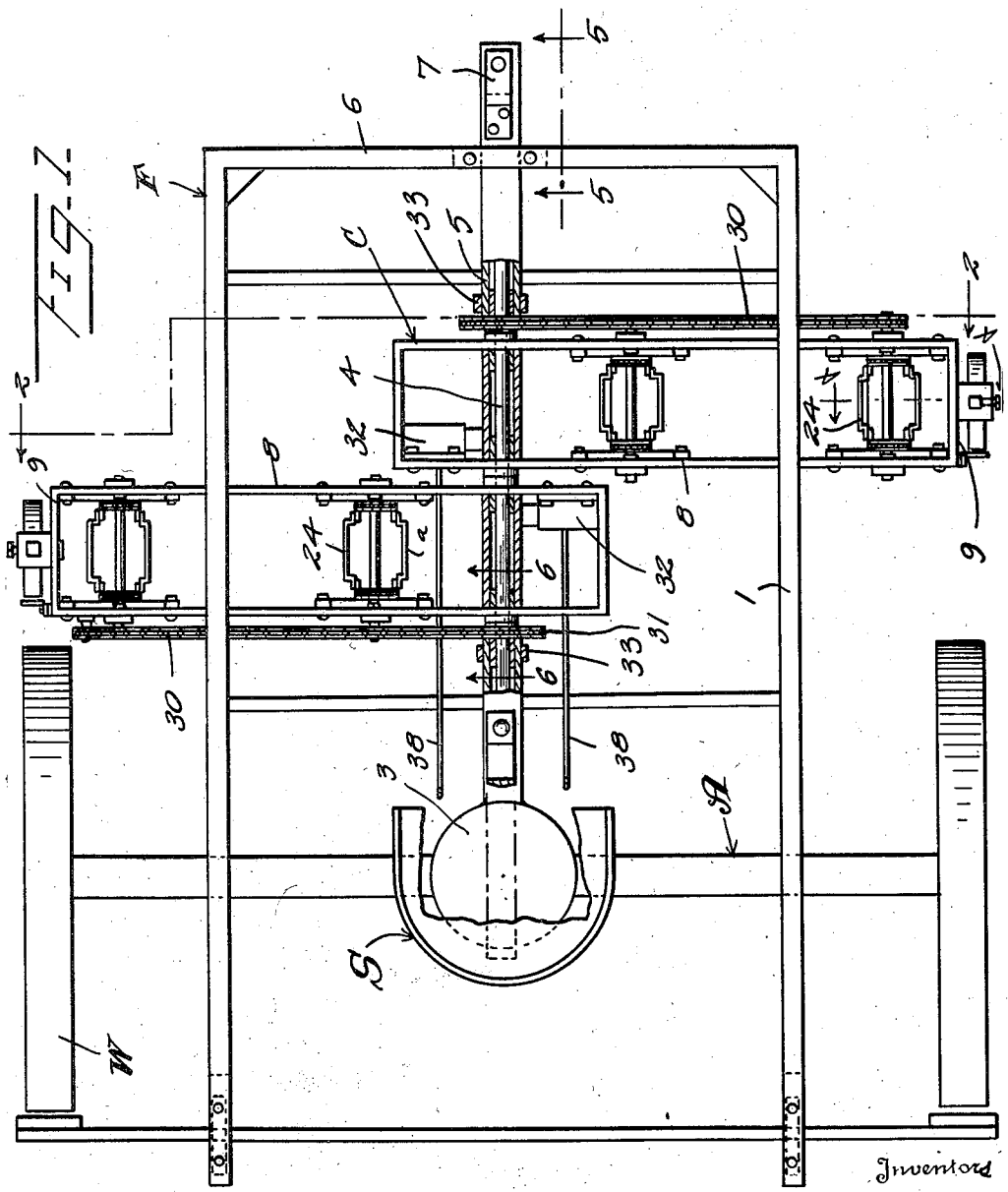
Figure 1 is a view in top plan of a plant blocker or chopper constructed in accordance with an embodiment of our invention.
Figure 2:
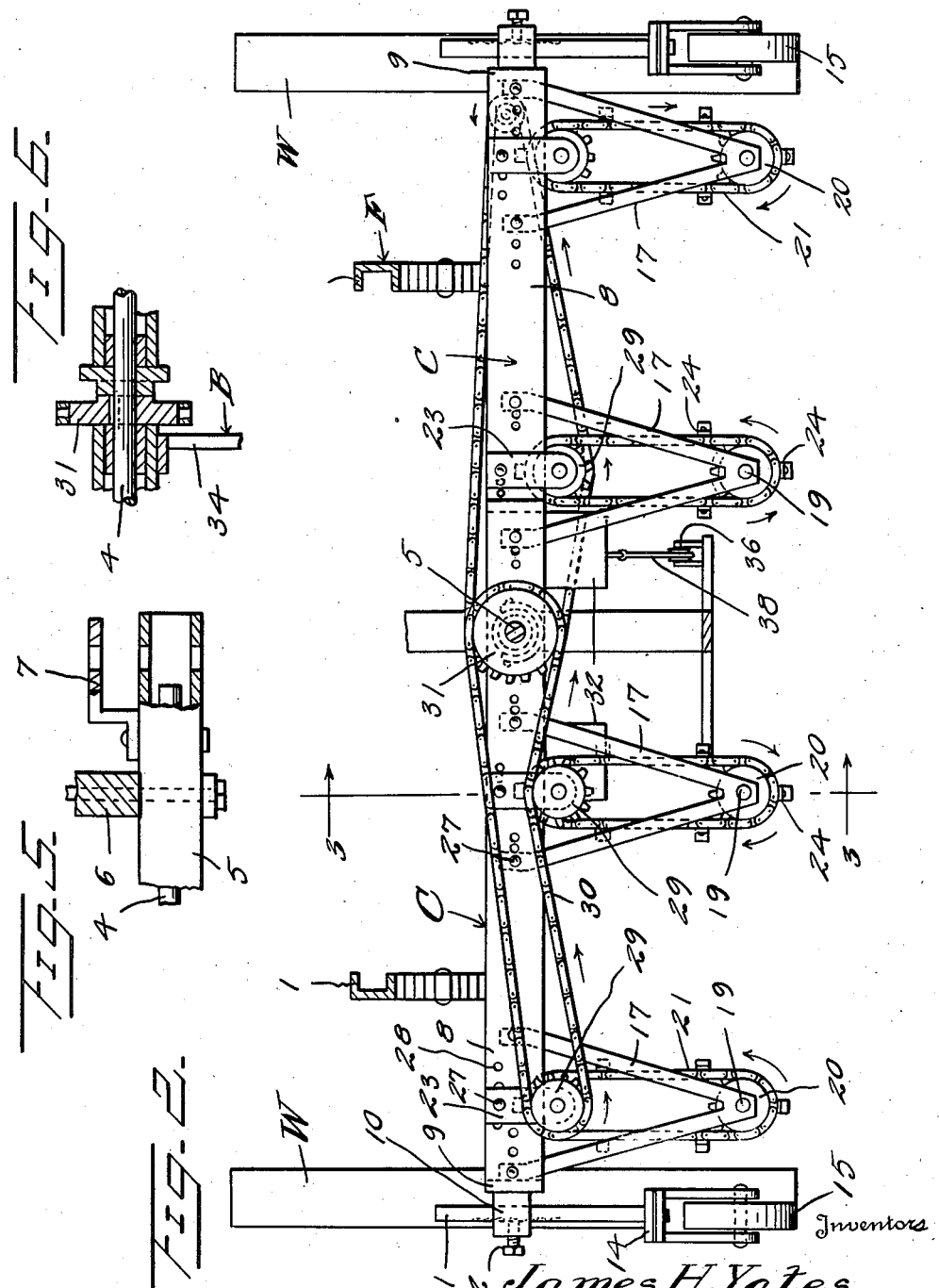
Figure 2 is a sectional view taken substantially on the line 2—2 of Figure 1, looking in the direction of the arrows.

As disclosed in the accompanying drawings, A denotes an axle housing of a conventional type which has resting thereon the rear portions of the side members 1 of a frame F of desired dimensions. Working in the housing A are the axles 2 having rotating therewith the ground engaging wheels W.

The inner end portions of the axles 2 are in driven connection in a well known manner, as generally indicated at 3, with a drive shaft 4 which extends forwardly and longitudinally of the frame F at substantially its longitudinal center. This shaft 4 is surrounded by the housing sections 5 which are held to the frame F in any manner preferred. As the particular mounting of these housings 5 forms no part of the present invention, a detailed description and illustration of such mounting is not believed to be necessary.

The shaft 4 at its forward end is adapted to be coupled in any manner (not shown) with a power take-off shaft of a tractor or any other suitable source of power. The forward housing section 5 extends a desired distance in advance of the front cross member 6 of the frame F and carries a clevis 7 whereby a means is provided for hitching the machine to a tractor or, if preferred, to allow the hitching thereto of a draft team. It will be obvious that if the machine is to be built to be drawn by stock, the frame F will be provided with suitable means for driving the shaft 4. It is believed to be obvious, however, that the source of power for the shaft 4 forms no part of the invention and may be as preferred.

Freely mounted upon the shaft 4 for up and down swinging movement are the inner portions of the side members 8 of the oppositely directed elongated chopper frames C. These frames C are disposed in opposite directions and are closely adjacent to each other and each of said frames C is of a length dependent upon the number of chopping units to be carried thereby and which in the present invention comprises two of such units.

The outer cross member 9 of each of the frames at substantially its longitudinal center has rigidly secured thereto an outstanding block 10 through which is freely and slidably disposed from below an elongated and vertically directed stem or shank 11 which is held in desired selected vertical adjustment by a holding bolt 12 threading into the block 10 and having binding engagement upon the stem or shank 11.

Swivelled, as at 14, to the lower extremity of the stem or shank 11 is a conventional caster 15, whereby the outer end portion of the frame C is effectively supported during a working operation and in a manner to readily allow the machine to change its course of travel. It is believed to be obvious that as each caster 15 passes over uneven ground, the associated frame C will readily raise and lower, thus assuring effective working action on the plants at all times.

The side members 8 of each of the frames C are provided therealong with the suitably positioned series of longitudinally spaced openings 16 to allow for the adjustable connection with said side members 8 of the frames 17 comprised in the chopping units. Each of these frames 17, as herein disclosed, is substantially V-shaped in form and, when applied, its apex is downwardly directed with its extremities held to a side member 8 by the bolts 18 or other removable elements. The openings 16 allow the frames 17 to be selectively arranged at different points lengthwise of a frame C as made necessary by the space between the plant rows.

Each frame 17 is substantially transversely aligned with a second frame 17 and the lower or apex portions of such transversely aligned frames 17 rotatably support a shaft 19 having fixed thereto inwardly of but immediately adjacent to the frames 17 the sprocket wheels 20 of desired radii. Disposed around these sprocket wheels 20 are the endless members 21, herein disclosed as chains, which are also directed around a shaft 22 rotatably supported by the bearings 23 carried by and depending from the side members 8 of the frame C.

Figure 3:
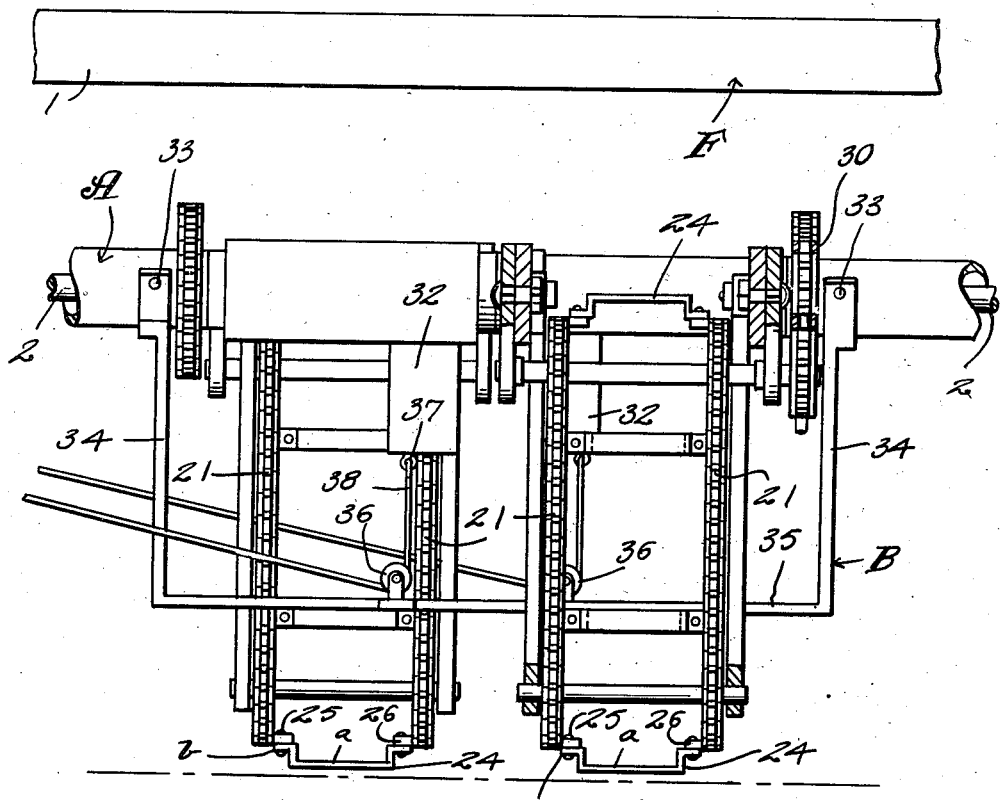
Figure 3 is an enlarged detailed sectional view taken substantially on the line 3—3 of Figure 2.
Figure 4:
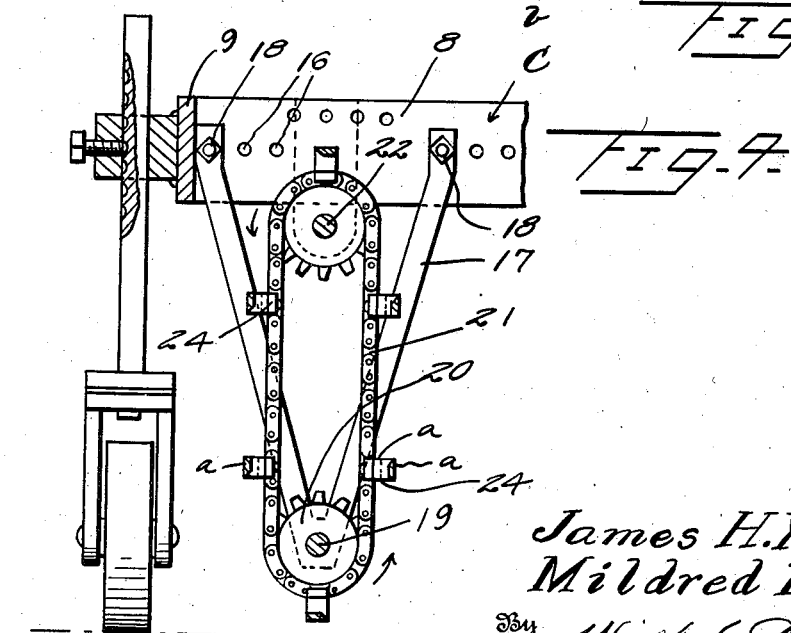
Figure 4 is an enlarged detailed sectional view taken substantially on the line 4—4 of Figure 1.

The stretches of the flexible members or chains 21 at predetermined points therealong are connected by the chopping members or blades 24. Each of these members or blades 24, as clearly illustrated in Figures 1 and 3 of the drawings, has its major central portion *a* outwardly offset and the extremities *b* constitute outwardly disposed feet which are riveted, as at 25, or otherwise rigidly secured to the inwardly disposed lugs 26 carried by certain of the links of the members 21.

It is to be noted that each of the bearings 23 is also readily adjusted to a selected position lengthwise of its member 8 through the medium of the removable bolt 27 or other holding element which is selectively insertible through the longitudinally spaced openings 28 provided in a side member 8 of the frame C.

The shafts 22 of each of the frames C have extremities extended to one side of the frame and said extended portions carry the sprocket wheels 29 with which are operatively connected the sprocket chain 30 which is also in driven connection with a sprocket wheel 31 fixed to rotate with the shaft 5. It will be noted that the chain 30 cooperates with its sprockets 29 in a manner to cause the flexible members or chains 21 to travel upwardly to assure effective balance of the machine and to facilitate the maintaining of the same in straight-ahead travel.

It is believed to be obvious, however, that the direction of travel of these members or chains 21, and particularly the inner member of each frame, may be reversed by changing the position of the coacting stretch of the chain 30 with respect thereto as, for example, the chain 30 which is illustrated in the accompanying drawings as underlying one of the sprocket wheels 29 may be adjusted to contact such sprocket wheel from above in the same manner as in connection with the inner sprocket wheel 29 of the second frame C.

The rear portions of the frame C carry the counterbalancing weights 32 whereby the up and down swinging movement of the frame C is facilitated not only as the machine is in working travel but when desired to raise the outer end portions of the frame C to make the chopping elements ineffective when the machine is not in use or is being transported from one location to another.

Any means desired may be provided for lifting the outer end portions of the frames C to inoperative position but such means may be of a character to allow one frame C to be raised independently of the other so that it may be possible in working to use the chopping elements of one of the frames C while the elements of the other frame are ineffective.

In the present embodiment of the invention the housing A has secured thereto, as at 33, the side arms 34 of a substantially U-shaped frame B. This frame B is of such dimensions as to have its intermediate or base member 35 extend outwardly beyond the inner end portions of the frame C. The central portions of the intermediate member 35 of the frame B has mounted thereon the pulleys 36, each of which underlies a balance weight 32. Secured to such balance weight 32, as at 37, is an end portion of a flexible member 38 which extends down and under the adjacent pulley 36 and extends to a point closely adjacent to the seat structure S and may be tied to such seat structure or otherwise secured after requisite pull has been imposed thereon to raise a frame C.

If desired, suitable cleaning members may be carried by the frames 17 for the chopper members or blades 24, said cleaning members being preferably in the nature of scrapers extending between and carried by the transversely aligned frames 17.

From the foregoing description it is thought to be obvious that a plant blocker or chopper constructed in accordance with our invention is particularly well adapted for use by reason of the convenience and facility with which it may be assembled and operated.

What is claimed is:

1. An implement of the class described comprising a portable body, a drive shaft carried thereby and extending in the general direction of travel of said body, an elongated frame disposed substantially horizontally laterally with respect to the body, means for pivotally supporting one end portion of said frame upon the shaft to allow the outer portion of such frame to have up and down swinging movement, chopper elements carried by the frame for movement in a continuous and substantially vertical path of travel, means for driving said chopper elements from the drive shaft, and a counterbalance carried by the inner portion of the frame upon the side of the shaft opposite from said outer portion.

2. An implement of the class described comprising a portable body, a drive shaft carried thereby and extending in the general direction of travel of said body, an elongated frame disposed substantially horizontally laterally with respect to the body and pivotally engaged with the shaft adjacent its inner end to allow the outer portion of the frame to have up and down swinging movement, said frame including side members, parts depending from the side members of the frame and substantially aligned transversely of the frame, a shaft rotatably supported by the lower portion of said parts, a shaft rotatably supported by the frame above the second mentioned shaft, a driven connection between the frame supported shaft and the drive shaft, endless connecting members between the second and third mentioned shafts at spaced points therealong, and chopping blades connecting said endless members at spaced points therealong.

3. An implement of the class described comprising a portable body, a drive shaft carried thereby and extending in the general direction of travel of said body, an elongated frame disposed substantially horizontally laterally with respect to the body and pivotally engaged adjoint its inner end with the shaft to allow the outer portion of the frame to have up and down swinging movement, said frame including side members, parts depending from the side members of the frame and substantially aligned transversely of the frame, a shaft rotatably supported by the lower portion of said parts, a shaft rotatably supported by the frame above the second mentioned shaft, a driven connection between the frame supported shaft and the drive shaft, endless connecting members between the second and third mentioned shafts at spaced points therealong, and chopping blades connecting said endless members at spaced points therealong, the major intermediate portion of each of such blades being outwardly offset.

JAMES H. YATES.
MILDRED THOMAS.